(12) United States Patent
Sayman

(10) Patent No.: US 6,553,306 B2
(45) Date of Patent: Apr. 22, 2003

(54) SYSTEM FOR CONTROLLING ENGINE BRAKING IN A VEHICLE DRIVELINE

(75) Inventor: Robert Anthony Sayman, Eriskirch (DE)

(73) Assignee: ZF Meritor, LLC, Maxton, NC (US)

( * ) Notice: Subject to any disclaimer, the term of this patent is extended or adjusted under 35 U.S.C. 154(b) by 95 days.

(21) Appl. No.: 09/790,269

(22) Filed: Feb. 21, 2001

(65) Prior Publication Data

US 2002/0116111 A1 Aug. 22, 2002

(51) Int. Cl.[7] .................... F02D 41/04; B60K 41/28
(52) U.S. Cl. ................ 701/110; 701/114; 123/350; 123/321; 180/197
(58) Field of Search ................ 701/110, 114, 701/115, 102; 123/321, 323, 350, 352; 180/197; 477/107, 109, 110, 111

(56) References Cited

U.S. PATENT DOCUMENTS

| 4,787,044 A | | 11/1988 | Nagata et al. | |
|---|---|---|---|---|
| 5,393,276 A | * | 2/1995 | White et al. | 477/107 |
| 5,498,195 A | * | 3/1996 | White et al. | 477/110 |
| 5,638,271 A | * | 6/1997 | White et al. | 477/107 |
| 5,910,069 A | * | 6/1999 | Markyvech | 477/109 |
| 6,052,644 A | * | 4/2000 | Murakami et al. | 123/319 |

FOREIGN PATENT DOCUMENTS

| EP | 0 638 445 A1 | 2/1995 |
|---|---|---|
| EP | 0 686 789 A1 | 12/1995 |
| GB | 2 100 384 A | 12/1982 |

* cited by examiner

Primary Examiner—Hieu T. Vo
(74) Attorney, Agent, or Firm—Carlson, Gaskey & Olds

(57) ABSTRACT

Engine braking in a vehicle driveline during transmission upshifts is controlled to provide more efficient and accurate speed synchronization. The physical limitations on the engine brake components are taken into account to determine a delay between an off request and the actual time that the engine brake turns off. This delay is factored into the time when the engine brake off request is made prior to a predicted time when the actual engine speed will meet a desired engine speed. By accounting for such delay, overshoot and undershoot during speed synchronization is avoided.

12 Claims, 2 Drawing Sheets

US 6,553,306 B2

SYSTEM FOR CONTROLLING ENGINE BRAKING IN A VEHICLE DRIVELINE

BACKGROUND OF THE INVENTION

This invention generally relates to engine speed control. More particularly, this invention relates to a strategy for controlling engine braking during a gear shift in a vehicle driveline.

A variety of vehicle drivelines are known. In many instances, especially with large trucks, the vehicle transmission includes a large number of available gear ratios. The task of shifting the transmission between the various gear ratios can prove to be complex and challenging, especially for inexperienced drivers. Those skilled in the art are continuously striving to make the task of driving such vehicles easier for drivers.

While various advances have been made, such as providing automated shift actuators and eliminating the requirements for manual clutch control, there is still room for improvement. For example, in systems where a driver is not required to manually operate a clutch, an engine controller controls engine speed to achieve synchronization with a required rotation speed in the gear box to be able to engage a subsequent gear. One attempt at facilitating engine speed control is to apply engine braking during an upshift. In most circumstances, engine braking is applied using rudimentary criteria.

There are several shortcomings in conventional engine braking arrangements. First, most do not accommodate the variations between different vehicles and different driveline components so that the control strategy is not readily adaptable or applicable for more than one vehicle. Another shortcoming is that most control strategies fail to recognize the limitations on the vehicle driveline components, including the engine braking components.

There is a need for an improved engine braking strategy to facilitate more accurate and more reliable synchronization between engine output speed and transmission input speed during assisted shifting procedures. This invention addresses that need while overcoming the shortcomings and drawbacks of prior attempts.

SUMMARY OF THE INVENTION

In general terms, this invention is a method of controlling engine speed during a gear shift procedure in a vehicle driveline. The method includes activating an engine brake, which is intended to reduce the engine speed. An expected time when the engine speed will be the same as a desired engine speed is determined. The engine brake is deactivated at a deactivation time before the expected time when the engine speed will be the same as the desired speed. The deactivation time accounts for any delay between the time a request is made to turn off the engine brake and the actual time that the engine brake will shut off in response to that request.

Another aspect of this invention is controlling engine speed during a gear shift procedure by comparing a predicted engine speed value and a predicted speed request. The predicted engine speed value is based upon a sum of a current engine speed value plus the product of an engine acceleration value times an engine brake deactivation time. The predicted speed request is based upon a sum of a requested speed value plus the product of a requested speed acceleration value times the engine brake deactivation time.

In one example, whenever the predicted engine speed value is less than the predicted speed request, the engine brake is turned off. Otherwise, the engine brake is turned on, assuming that a gear shift procedure when engine braking is desired is occurring.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENT

Figure 1:
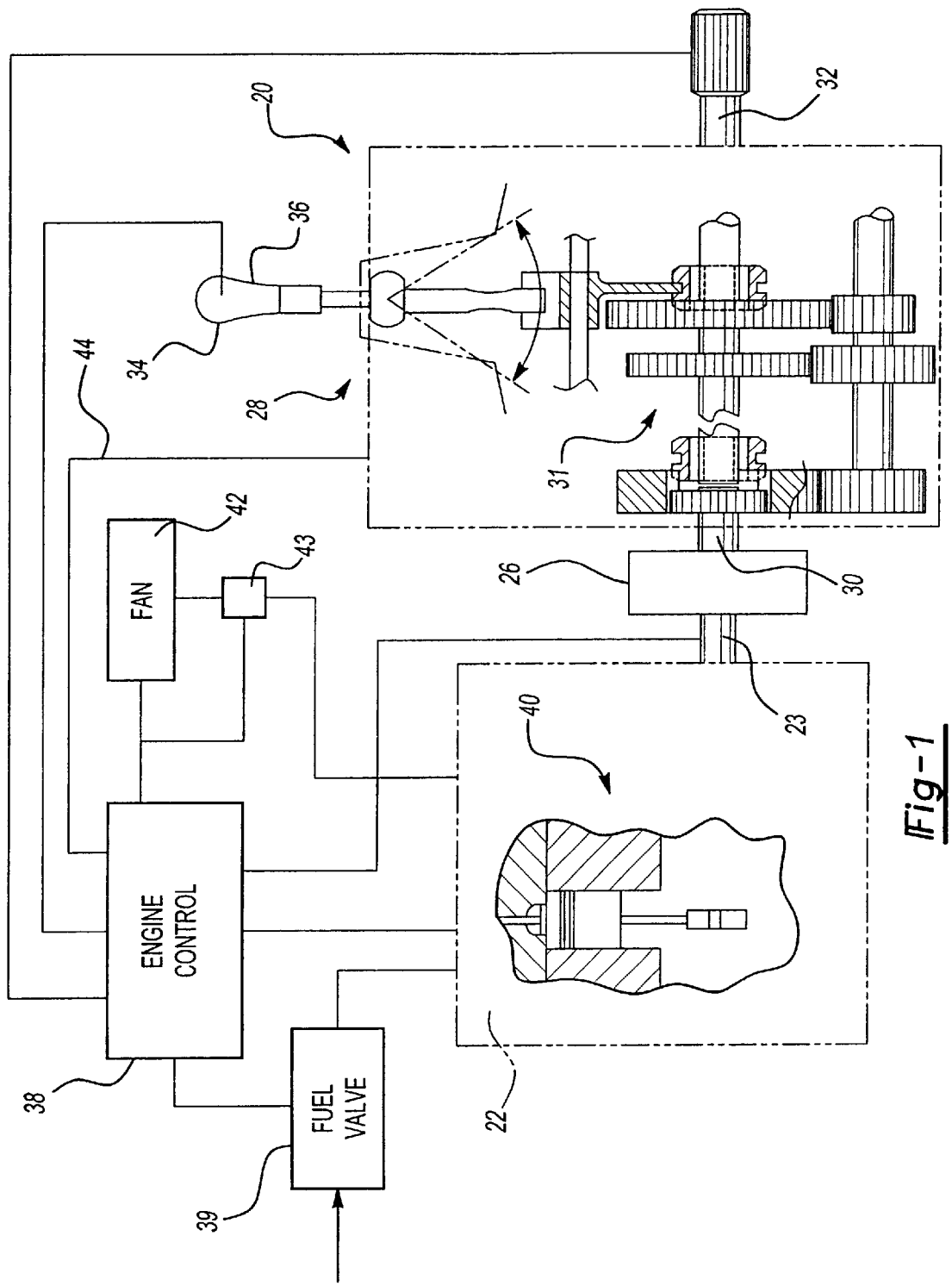
FIG. 1 schematically illustrates a vehicle driveline designed according to this invention.

A vehicle driveline 20 includes an engine 22 that has an output shaft 23. A clutch 26 selectively couples a transmission 28 to the engine 22. The transmission 28 includes an input shaft 30, a plurality of selectively engaged gears 31 and an output shaft 32 that transmits driving torque to the wheels of the vehicle.

The illustrated driveline 20 includes a shift lever 34 that is manually operable by a driver to manually shift between the gears 31 in the transmission 28. A shift intent switch 36 preferably is provided on the shift lever 34 allowing the driver to provide a signal indicating a desire to make an upshift or a downshift in the transmission.

While the illustrated example includes a manual shift lever, this invention is not limited to such vehicle drivelines or transmissions. The shift-by-wire style transmissions will benefit from the control strategies and methods of this invention. Additionally, other vehicle drivelines where a driver is provided with some automated shift assisting, will benefit from this invention whenever engine braking may be desired.

An engine controller 38 preferably controls operation of a fuel valve 39 for supplying fuel to the engine 22 under certain conditions. Particularly, the engine controller 38 preferably controls engine speed during shifting procedures to provide proper synchronization between the speed of the engine output shaft 23 and the transmission input shaft 30 to facilitate engaging the gears 31. This is particularly useful in circumstances where the clutch 26 need not be actuated, but instead speed synchronization techniques are utilized to facilitate shifting gears.

Particularly during upshifts of the transmission, it may be desirable to include engine braking (schematically illustrated at 40) for rapidly reducing the speed of the engine. As known, an additional way of providing engine braking is to include a separate load 42 that is selectively engaged using a control actuator 43 to absorb power from the engine 22 and, therefore, to slow down the engine speed.

In use, the controller 38 receives a signal 44 that a shift in the transmission is occurring. The signal may come from a variety of sources. One example includes the shift intent switch 36 actuated by the driver. Another example is where sensors within the transmission 28 indicate movement of a shift lever or the gear engaging portions of the transmission 28, which indicate a shift in the transmission. When the controller 38 determines that a shift is about to occur or occurring, it then preferably determines whether engine braking will be needed. Engine braking typically will be desired when an upshift of the transmission is occurring so that the engine speed may be reduced more quickly.

Figure 2:
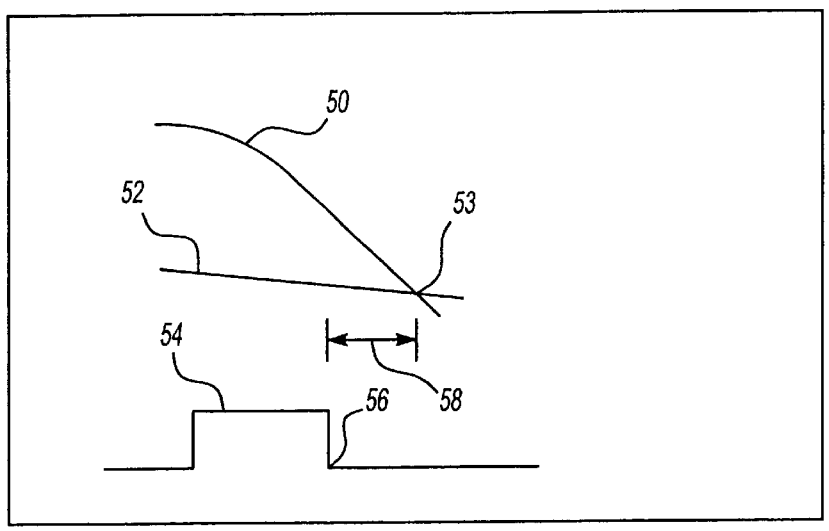
FIG. 2 graphically illustrates a method of this invention.

FIG. 2 graphically illustrates a control strategy of this invention for controlling engine braking during a shifting procedure. A plot 50 shows the actual engine speed during a shift. A plot 52 shows a desired engine speed that is necessary to achieve proper synchronization for effectively completing a shift. The point in time 53 shows when the actual engine speed intersects with the desired engine speed.

An engine braking control signal 54 is on while the engine speed is being reduced. According to the method of this invention, the engine braking on signal 54 preferably is turned off at a time 56 prior to the time 53 when the actual engine speed is predicted to intersect with the desired engine speed 52. The engine brake deactivation time 58, which is the difference between the time 56 and 53, takes into account the physical limitations of the engine braking system. Most engine brakes do not deactivate instantaneously upon receiving an off command signal. The deactivation time 58 accounts for any physical delays within the driveline components such that the engine brake actually turns off at the proper time. By turning off the engine brake earlier than the expected intersection time between the actual engine speed and the desired engine speed, overshoot or undershoot are avoided and a more accurate and efficient synchronization speed is achieved.

The controller 38 preferably takes into account a variety of variables when determining the magnitude of the deactivation time 58. Examples include observed engine brake performance characteristics, a determination whether a single shift or a skip shift is occurring, engine temperature, vehicle load, driver demand, driver style, road conditions, among others. These factors may have an affect on the operation of the engine brake or the ability of the engine to reach the desired engine speed. The controller 38 preferably is programmed to recognize at least one of such variables to make adjustments, as may be needed, to the determination of the activation time 58.

Another benefit of this invention is that the engine speed will automatically be reduced for a longer period when the vehicle is decelerating rapidly on a grade, for example. This enhances vehicle performance in mountainous areas, for example.

Another way in which the engine brake deactivation time 58 is utilized with this invention is in a comparison of a predicted engine speed to a predicted speed request. In this example, the predicted engine speed is determined as the sum of the engine speed plus the product of an engine acceleration value times the engine brake deactivation time. The predicted speed request is determined as the sum of the requested speed plus the product of a requested speed acceleration value times the engine brake deactivation time. Whenever an upshift is occurring, the controller 38 preferably compares the predicted engine speed to the predicted speed request. The engine brake request signal 54 preferably is turned on whenever the predicted engine speed is greater than the predicted speed request and the engine brake request is turned off as soon as the predicted engine speed is less than the predicted speed request. In this way, the engine brake deactivation time provides a factor for deactivating the engine brake more accurately to achieve better synchronization.

Figure 3:
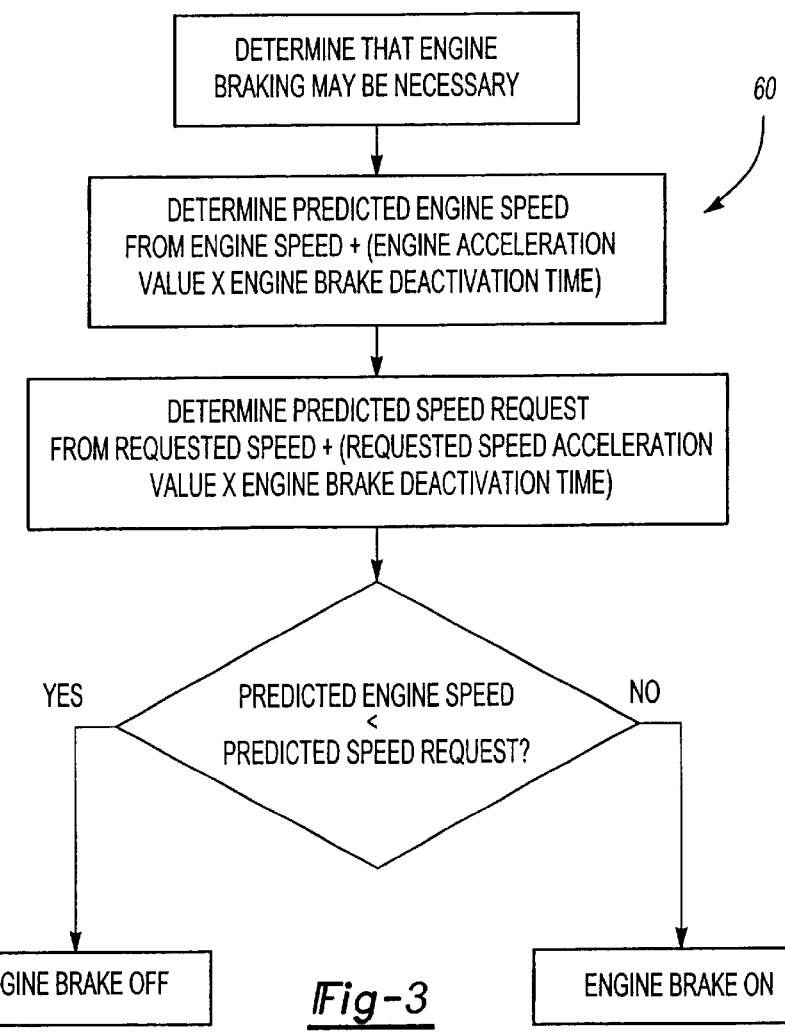
FIG. 3 is a flow chart diagram illustrating another aspect of the method of this invention.

This aspect of this invention is illustrated in flow chart form at 60 in FIG. 3.

Given this description, those skilled in the art will be able to choose from among commercially available components and processors to realize the engine controller 38. Those skilled in the art who have the benefit of this description will be able to program the controller 38 to accomplish the result provided by this invention.

The preceding description is exemplary rather than limiting in nature. Variations and modifications may become apparent to those skilled in the art that do not necessarily depart from the purview and spirit of this invention. The scope of legal protection given to this invention can only be determined by studying the following claims.

The following is claimed:

1. A vehicle driveline assembly, comprising:
   an engine;
   a transmission selectively coupled with the engine and having a plurality of selectively engaged gear ratios;
   a shift actuator that is operable by a vehicle driver to at least initiate a shift between the gear ratios;
   an engine brake associated with the engine; and
   a controller that determines when a gear shift is occurring and determines when to activate the engine brake to selectively reduce an engine speed value of the engine, the controller determining a predicted engine rotation value based upon a sum of a current engine rotation value plus the product of an engine acceleration value times an engine brake deactivation time, a predicted speed request based upon a sum of a requested rotation value plus the product of a requested rotation acceleration value times the engine brake deactivation time, the controller deactivating the engine brake when a comparison between the predicted engine speed value and the predicted speed request is within a chosen range.

2. The assembly of claim 1, wherein the controller determines the deactivation time based upon a time that it takes the engine brake to shut off responsive to a deactivation from the controller.

3. The assembly of claim 1, wherein the controller determines the deactivation time based upon at least one vehicle performance characteristic selected from the group including observed engine brake performance, a number of gears changed during a shift, engine temperature, vehicle load, driver demand and a road condition.

4. The assembly of claim 1, wherein the controller deactivates the engine brake when the predicted engine speed value is less than the predicted speed request.

5. A method of controlling engine speed during a gear shift procedure in a vehicle driveline, comprising the steps of:
   (A) determining a predicted engine speed value based upon a sum of a current engine speed value plus the product of an engine acceleration value times an engine brake deactivation time;
   (B) determining a predicted speed request based upon a sum of a requested speed value plus the product of a requested rotation acceleration value times the engine brake deactivation time; and
   (C) deactivating the engine brake when a comparison between the predicted engine speed value and the predicted speed request is within a chosen range.

6. The method of claim 5, including deactivating the engine brake when the predicted engine speed value is less than the predicted speed request.

7. A method of controlling engine speed during a gear shift procedure in a vehicle driveline, comprising the stops of:
   (A) activating an engine brake;
   (B) determining an expected time when an engine speed will be the same as a desired engine speed including determining a predicted engine rotation value based upon a sum of a current engine rotation value plus the product of an engine acceleration value tunes an engine brake deactivation time, determining a predicted speed request based upon a sum of a requested rotation value plus the product of a requested rotation acceleration value times the engine brake deactivation time;

(C) deactivating the engine brake at a determined deactivation time before the expected time of step (B) based upon a comparison between the predicted engine rotation value and the predicted speed request.

8. The method of claim 7, wherein step (C) includes determining the deactivation time based upon a time that it takes for the engine brake to deactivate responsive to a deactivation from a controller.

9. The method of claim 7, wherein step (C) includes determining the deactivation time based upon at least one vehicle performance characteristic selected from the group including observed engine brake performance, a number of gears changed during a shift, engine temperature, vehicle load, driver demand and a road condition.

10. The method of claim 7, wherein step (B) includes monitoring a rate of change of engine speed and predicting the expected time based upon the rate of change.

11. The method of claim 7, including performing steps (A) through (C) automatically using an electronic controller.

12. The method of claim 7, including deactivating the engine brake when the predicted engine rotation value is less than the predicted speed request.

* * * * *

UNITED STATES PATENT AND TRADEMARK OFFICE
CERTIFICATE OF CORRECTION

PATENT NO. : 6,553,306 B2  Page 1 of 1
DATED : April 22, 2003
INVENTOR(S) : Robert Anthony Sayman It is certified that error appears in the above-identified patent and that said Letters Patent is hereby corrected as shown below:

<u>Column 4,</u>
Line 67, "tunes" should be -- times --.

Signed and Sealed this

Ninth Day of September, 2003

JAMES E. ROGAN
*Director of the United States Patent and Trademark Office*